(12) United States Patent
Rajamony et al.

(10) Patent No.: US 8,296,615 B2
(45) Date of Patent: Oct. 23, 2012

(54) SYSTEM AND METHOD FOR GENERATING DATA MIGRATION PLAN

(75) Inventors: Raghunath Rajamony, Karnataka (IN); Ashok Gopinath, Karnataka (IN)

(73) Assignee: Infosys Limited, Bangalore (IN)

( * ) Notice: Subject to any disclaimer, the term of this patent is extended or adjusted under 35 U.S.C. 154(b) by 1210 days.

(21) Appl. No.: 11/941,963

(22) Filed: Nov. 18, 2007

(65) Prior Publication Data

US 2008/0255895 A1    Oct. 16, 2008

(30) Foreign Application Priority Data

Nov. 17, 2006    (IN) .............. 2131/CHE/2006

(51) Int. Cl.
*G01R 31/30* (2006.01)
(52) U.S. Cl. ..................... 714/745; 705/7.12
(58) Field of Classification Search ............... 711/101, 711/170; 705/35, 7, 7.12; 717/168; 714/769, 714/33, 745
See application file for complete search history.

(56) References Cited

U.S. PATENT DOCUMENTS

| | | | |
|---|---|---|---|
| 6,219,654 B1 | 4/2001 | Ruffin | |
| 6,260,020 B1 | 7/2001 | Ruffin et al. | |
| 6,381,619 B1* | 4/2002 | Borowsky et al. | 711/170 |
| 6,571,258 B1* | 5/2003 | Borowsky et al. | 1/1 |
| 6,968,324 B1 | 11/2005 | Ruffin et al. | |
| 7,117,486 B2 | 10/2006 | Wong et al. | |
| 7,127,421 B1* | 10/2006 | Beacham et al. | 705/35 |
| 7,383,405 B2* | 6/2008 | Vega et al. | 711/162 |
| 2003/0055697 A1* | 3/2003 | Macken et al. | 705/7 |
| 2003/0192028 A1* | 10/2003 | Gusler et al. | 717/101 |
| 2007/0011669 A1* | 1/2007 | Varma et al. | 717/168 |
| 2007/0239500 A1* | 10/2007 | Barrett et al. | 705/7 |

* cited by examiner

*Primary Examiner* — David Ton
(74) *Attorney, Agent, or Firm* — Klarquist Sparkman, LLP

(57) ABSTRACT

A system and method for generating a migration plan for migrating data from a first electronic medium to a second electronic medium is provided. The system comprises a migration readiness assessment module for determining a migration recommendation; an effort estimation module for determining a total effort required for migrating data from a first electronic medium to a second electronic medium; and a migration plan generator module for generating a migration plan based on the determined migration recommendation and the total estimated effort.

17 Claims, 2 Drawing Sheets

Figure 1:
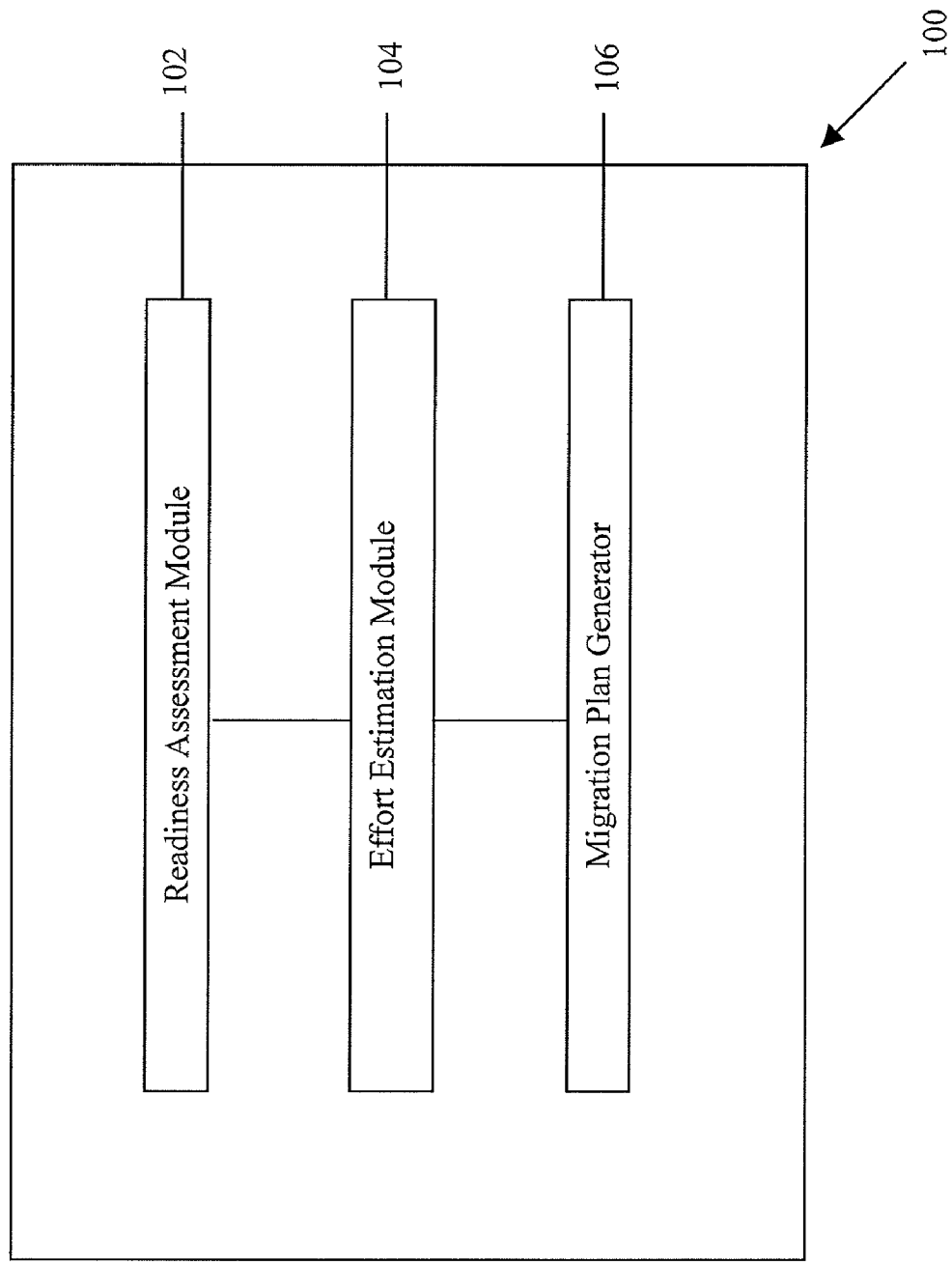

SYSTEM AND METHOD FOR GENERATING DATA MIGRATION PLAN

FIELD OF INVENTION

The present invention is directed towards providing a data migration framework which is vendor and technology independent. More particularly, the present invention provides a system and method for performing data migration readiness assessment, data migration effort estimation and provides a recommended data migration plan.

BACKGROUND OF THE INVENTION

The advent and progression of information technology has resulted in proliferation of data. Various data intensive sectors such as banking and financial services, insurance, telecommunication, automobile and health care have resulted in generation of enormous amount of data. Organizations working with such large volumes of data face several challenges while moving data from legacy systems to open platform or while consolidating data from various platforms due to different formats in which it is stored. In addition, various critical activities such as mergers and acquisitions, up-gradation to latest technologies, compliance to various law enforcement and government bodies require data to be uniform and readily accessible.

The need to transfer data quickly and efficiently across various mediums has resulted in the use of data migrations systems. Data migration is the process of transferring data between storage types, formats, or computer systems. Data migration is generally performed programmatically to achieve an automated migration, freeing up human resources from the tedious task. Data migration offers various advantages such as improved data quality, elimination of redundant or obsolete information, and synchronization of existing data for a new system.

Before performing any data migration activity, it would be preferable to be able to assess the data as well as infrastructural readiness for migration, so that the existing architecture and data of the source system may be evaluated and appropriate infrastructure such as servers, manpower etc. may be arranged in advance and the migration activity may be carried out smoothly. In addition, awareness of the amount of effort required in terms of cost, manpower, man hours, etc. is also required to perform a specific data migration. Further, a complete migration plan is required to be developed before carrying out any migration to prevent any unforeseen critical scenarios.

Even though there are several advantages associated with data migration, assessing the system for migration readiness and estimating the total effort required before migration remains a challenging task. One of the challenges faced while performing a migration activity is lack of knowledge which results in conflicting information and various lacunae in the migration plan.

In addition, designing a migration plan manually is a challenging and time consuming task requiring skills of a domain expert. Further, such manual design may not be time efficient and may also be prone to human errors. Furthermore, due to multiple environments from where the data is fetched, there is always a need of highly skilled resource to assess the readiness and effort required for migration. Also, the cost and efforts involved in procuring such resources for different environments makes the entire process arduous and infeasible.

Consequently, there is a need for an efficient system and method for assessing a user's data migration needs and readiness for data migration. Further, there is a need for a system and method to estimate the total effort required to migrate data from a source medium to a target medium. Furthermore, there is a need for a software tool that recommends a plan for migrating data, identifies migration issues and critical points and provides a subsequent plan for implementation.

SUMMARY OF THE INVENTION

A system for generating a migration plan for migrating data from a first electronic medium to a second electronic medium is provided. The system comprises a migration readiness assessment module for determining a migration recommendation; an effort estimation module for determining a total effort required for migrating data from a first electronic medium to a second electronic medium; and a migration plan generator module for generating a migration plan based on the determined migration recommendation and the total estimated effort.

In an embodiment of the present invention, the migration readiness assessment module comprises a set of questions and a plurality of corresponding response options with respect to each question, each question being associated with a predetermined weight and each response option being associated with a predetermined score. A migration recommendation is determined by computing a summation of the products of weights associated with each question and the score associated with a response option selected corresponding to the question. The migration recommendation is one of a recommendation in favour of migration and a recommendation against migration.

In an embodiment of the present invention, the effort estimation module comprises a set of questions and a plurality of corresponding response options with respect to each question, each question being associated with a plurality of predetermined weights, each of the plurality of weights depending upon each of the response options corresponding to the question. The total effort is determined by computing a summation of the products of the weight associated with each question, a critical value corresponding to each question and an effort determined corresponding to each question.

In an embodiment of the present invention, the migration plan is a sequence of steps to be followed for performing the migration of data from a first electronic medium to a second electronic medium.

A method for generating a migration plan for migrating data from a first electronic medium to a second electronic medium is also provided. The method comprises the steps of firstly performing a migration readiness assessment for determining a migration recommendation; secondly determining a total effort required for migrating data from a first electronic medium to a second electronic medium; and thirdly generating a migration plan based on the determined migration recommendation and the total estimated effort.

In an embodiment of the present invention, the step of performing a migration readiness assessment comprises the steps of firstly presenting a set of questions for obtaining information regarding data readiness, each question being associated with a predetermined weight and corresponding to a plurality of response options, each response option being associated with a predetermined score; secondly selecting a response option corresponding to each presented question; thirdly computing a migration assessment weight by determining a summation of the products of weights associated with each question and the score associated with a response option selected corresponding to the question; and fourthly determining a migration recommendation based on the computed migration assessment weight, the migration recommendation being one of a recommendation in favour of migration and a recommendation against migration.

In an embodiment of the present invention, the step of determining a total effort required for migrating data from a first electronic medium to a second electronic medium comprises the steps of firstly presenting a set of questions for obtaining information regarding migration requirements, each question corresponding to a plurality of response options and being associated with a plurality of predetermined weights, the weights varying based on the corresponding response options; secondly selecting a response option corresponding to each presented question; thirdly determining a weight associated with each question depending upon the response option selected for the question; fourthly obtaining a critical value corresponding to each question; fifthly determining an effort corresponding to each question; and sixthly computing a summation of the products of the weight associated with each question, the critical value corresponding to each question and the determined effort corresponding to each question. The effort corresponding to each question is determined by using a numerical value associated with the response selected corresponding to the question.

In an embodiment of the present invention, the step of generating a migration plan comprises generating a sequence of execution of tasks involved in the migration based on at least one of complexity of the task, size of the task and priority of the task.

In various embodiments of the present invention, the system and method for generating a migration plan for migrating data from a first electronic medium to a second electronic medium may be provided on a computer readable medium with computer executable instructions embodied therein.

BRIEF DESCRIPTION OF THE ACCOMPANYING DRAWINGS

Figure 2:
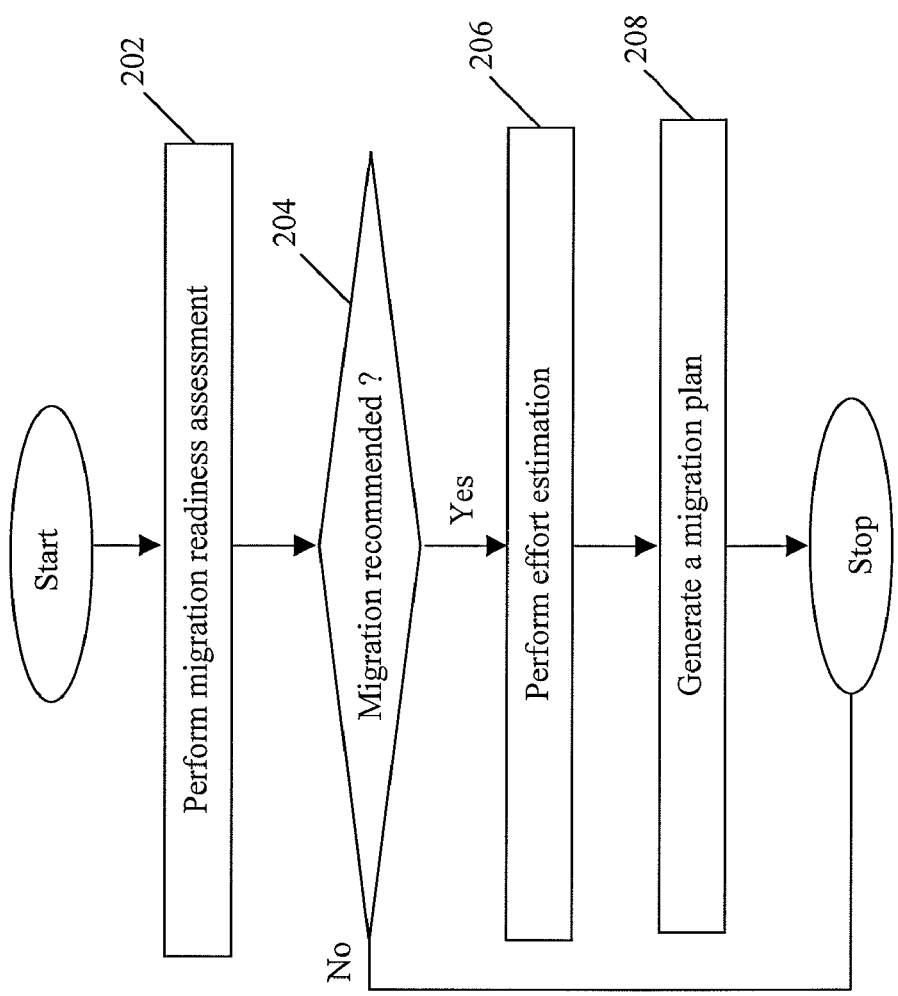

The present invention is described by way of embodiments illustrated in the accompanying drawings wherein:

FIG. 1 is a block diagram depicting a system for performing data migration readiness assessment, data migration effort estimation and providing a recommended data migration plan; and FIG. 2 is a flowchart illustrating a method for performing data migration readiness assessment, data migration effort estimation and providing a recommended data migration plan.

DETAILED DESCRIPTION OF THE INVENTION

A system and method for performing data migration readiness assessment, data migration effort estimation and providing a recommended data migration plan are described herein. The invention provides a data migration framework which is vendor and technology independent. The data migration framework aids and enables users to plan their data migration strategy in a manner which is cost and time efficient. The method of the invention may be provided on a computer readable medium.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

FIG. 1 is a block diagram depicting a system 100 for performing data migration readiness assessment, data migration effort estimation and providing a recommended data migration plan. System 100 comprises a Readiness Assessment (RA) module 102, an Effort Estimation (EE) module 104 and Migration Plan Generator (MPG) module 106.

RA module 102 assesses a user's data migration needs. RA module 102 enables the user to understand data migration requirements and determine the level of readiness for undertaking the migration activity. RA module 102 presents a plurality of questions to the user to determine migration readiness. Examples of questions presented comprise questions for determining if a rule based and table driven process exists for the business functionalities of the user, if the user's data model requires modification to support data mining and data warehousing features, data volume that requires to be migrated, etc. Various other questions may be presented to the user to obtain a comprehensive assessment of the user's data and data migration requirements.

In an embodiment of the present invention, the questions presented by RA module 102 are classified under five categories, namely, 'General Data Migration Questionnaire', 'Planning & Prioritization Phase', 'Cost Factor', 'Systems & Security Requirements', and 'Approach & Measures'. In other embodiments of the present invention, the said categories may be modified/deleted and further, multiple other categories of questions for gathering required assessment information from the user may be added to the RA module 102.

In various embodiments of the present invention, a user is prompted to provide a response to each of the questions presented either by selecting one out of multiple options provided, or by entering a response in a predefined format. In an embodiment of the present invention, RA module 102 presents a predetermined number of questions in a predetermined order to gather assessment information from the user. In another embodiment of the present invention, the order of questions put before the user depends on the answers provided by the user. For example, a second question may be presented after a first question if the user's response to the first question is option a, however a third question may be presented if the user's response to the first question is option b.

In various embodiments of the present invention, a weight is assigned to each question presented by RA module 102. Further, each of the options corresponding to each of the questions is assigned a predetermined score. The weights and the scores are predetermined based on the criticality and importance of the question and the option in assessing the user's data migration requirements as well as the readiness of the user's data and migration tools. In an embodiment of the present invention, the values of the weights and the scores assigned to the questions and responses may range between 1 to 9.

Once the user has responded to a predefined number of questions, RA module 102 computes a total number of points awarded to the user. The total number of points may be computed by firstly computing a product of the weight assigned to a question and the score assigned to the selected response corresponding to the question, with respect to each question presented to the user; and secondly computing a summation of all the computed products. In an embodiment of the present invention, the total number of points are computed as:

$$\Sigma = a_1 x_1 + a_2 x_2 + \ldots + a_n x_n \qquad (1)$$

where:

$a_1$ depicts the weight assigned to a question 1, there being a total of n questions;

$x_1$ depicts the score assigned to a response option that is selected corresponding to the question 1; and $a_1 x_1$ depicts the points computed for the question 1 and the corresponding selected response.

RA module 102 aids the user in taking a migration decision by providing a recommended course of action based on the total number of points scored by the user. In an embodiment of the present invention, if the total number of points scored by a user is less than or equal to a first predetermined threshold value, a recommendation against undertaking a migration activity is provided to the user. Alternately, the user may be advised to leverage existing tools in order to perform desired functions. If the total number of points scored by a user is less than or equal to a second predetermined threshold value, a recommendation in favour of undertaking a migration activity is provided to the user. In various embodiments of the present invention, the threshold values are predetermined based on the criticality and importance of the questions responded to by the user for assessing the user's data migration requirements as well as the readiness of the user's data and migration tools. Further, in various embodiments of the present invention, a plurality of threshold values may be predetermined in order to provide a personalized recommendation to a user aiding the user's data migration decision.

EE module 104 computes a total effort required in undertaking a migration activity in terms of person days. EE module 104 presents a plurality of questions to the user to perform an effort estimation. Examples of questions presented comprise questions for determining the number of users that would be migrated to a target application, data volume that requires to be migrated, any existing tools available for migration, etc. Various other questions may be presented to the user to obtain a comprehensive assessment of the current state of the user's data and data migration requirements. The effort estimation is determined across multiple dimensions such as priority of implementation of a task, task criticality factor i.e. highest priority and increased supervision, highest priority, increased supervision, etc., onsite/offshore presence, compliance & regulatory issues, etc.

In an embodiment of the present invention, the questions presented by EE module 104 are classified under five categories, namely, 'General Data Migration Questionnaire', 'Architecture', 'Data Profiling and Needs'. In other embodiments of the present invention, the said categories may be modified/deleted and further, multiple other categories of questions for gathering required assessment information from the user may be added to the EE module 104.

In various embodiments of the present invention, a user is prompted to provide a response to each of the questions presented either by selecting one out of multiple options provided, or by entering a response in a predefined format. In an embodiment of the present invention, EE module 104 presents a predetermined number of questions in a predetermined order to gather information from the user. In another embodiment of the present invention, the order of questions put before the user depends on the answers provided by the user.

In various embodiments of the present invention, the user is required to enter a 'critical value' corresponding to each question in addition to providing a response to the question. The 'critical value' depends on the importance and criticality of the task being referred to in each question. The critical value entered by the user results in a rank being assigned to each question. For example, Rank 5 may be assigned to a question if the corresponding 'critical value' entered by the user is 'highest priority and increased supervision', Rank 4 may be assigned to a question if the corresponding 'critical value' entered by the user is 'highest priority', Rank 3 may be assigned to a question if the corresponding 'critical value' entered by the user is 'increased supervision', Rank 2 may be assigned to a question if the corresponding 'critical value' entered by the user is 'regulatory compliance' and Rank 1 may be assigned to a question if the corresponding 'critical value' entered by the user is 'regular flow'

In various embodiments of the present invention, a weight is assigned to each question presented by EE module 104 based on the corresponding response option selected by the user. For example, if a first option is selected by the user a first predetermined weight is assigned to the question whereas if a second option is selected by the user a second pre determined weight is assigned to the question. The weights are predetermined based on the criticality and importance of the question and the option in assessing the user's data migration requirements as well as the readiness of the user's data and migration tools. In an embodiment of the present invention, the values of the weights assigned to the questions and responses may range from 1 to 9.

Further, an effort in person days is computed for each question based on the option selected by the user corresponding to the question. In an embodiment of the present invention, the user is prompted to select one response option from among response options defined as 'High Complexity (HC)', 'Medium Complexity (MC)', 'Low Complexity (LC)' or provide an exact response value. Each of the options HC, MC and LC are associated with a numerical value range. The effort in person days is computed corresponding to each question by using the response option selected by the user corresponding to the question as:

If numerical value associated with the selected option>250

$$\text{Effort in Person Days} = MC + (HC - MC) * ((\text{selected response option} - 250)/150) \qquad (2)$$

If numerical value associated with the selected option>50 and <250

$$\text{Effort in Person Days} = LC + (MC - LC) * ((\text{selected response option} - 50)/200) \qquad (3)$$

If numerical value associated with the selected option>10 and <50

$$\text{Effort in Person Days} = 4 + (LC - 4) * ((\text{selected response option} - 10)/40) \qquad (4)$$

Once the user has responded to a predefined number of questions, EE module 104 computes a total effort in person days required in order to undertake the migration activity. In an embodiment of the present invention, the total effort is computed as:

$$\Sigma = \alpha_1 a_{(1,1)} x_{(1,1)} + \alpha_2 a_{(2,1)} x_{(2,1)} + \ldots + \alpha_n a_{(n,1)} x_{(n,1)} \qquad (5)$$

where:

it has been assumed that the user has selected a first response option corresponding to each question;

Σ depicts the total effort in terms of person days corresponding to questions numbered from 1 to n, where n>1;

$\alpha_1$ depicts the critical value entered by the user corresponding to a question numbered 1, where α>1; if the user does not enter a critical value corresponding to a question a default value of 1 is assigned to α;

$a_1$ depicts the weight assigned to a question numbered 1 which in-turn is determined based on the response option selected corresponding to the question;

$x_1$ depicts the effort in person days for question 1 and selected response option 1; and $$a_{(1,1)} * x_{(1,1)} \neq a_{(1,2)} * x_{(1,2)}$$

MPG module 106 provides a migration plan comprising step by step instructions to aid the user in executing the migration activity. MPG module 106 generates the migration plan by using the response options provided by the user to the questions presented by the EE module 104 and the total effort estimated in person days. The migration plan generated is dynamic in nature and may change based on the critical values specified and response options selected by the user to the EE module 104.

In one embodiment, the migration plan comprise of two components i.e. assigning different tasks to be performed during the migration activity to the different categories defined with respect to EE module 104 and sequencing the tasks within each category.

In various embodiments, the sequence of execution of the tasks depends upon three parameters namely complexity, size and priority. The value of each of these parameters is obtained from the user via the questions presented by the EE module 104.

An exemplary migration plan generated by MPG module 106 is depicted as:

1. System Analysis and Architecture Awareness:
    a. Review Requirement Document.
    b. Understand the project scope.
    c. Identify the effort estimation involved.
    d. Do a System Analysis along with the database and other interfaces involved in the migration scenario.
    e. Come up with the Architecture document, System Appreciation Document, Business Case scenario document.
    f. Cross Verify the same with business and stake holders of the project including the small and medium enterprises (SME's).
    g. Perform architecture evaluation, refine requirements and assess the non-functional attributes.
    h. Perform a detailed documentation of the source systems, target system, and data elements in the fray and verify the correctness against the architecture description model.
    i. Prepare Data Dictionary and data model and also a data flow diagram for the process and the entities.
    j. Verify the data sources, and identify how much of an effort needs to be performed for data cleansing operation at the source system level.
    k. Come up with a checklist to address the source systems in terms of data quality.
    l. Set up automated process.
    m. Filter data.
    n. Plan future activities to eliminate the bad data at source.
    o. Document the frequently occurring data queue
    p. Incorporate the inputs of the review meeting in the appropriate documents.
    q. Prepare a detailed case study of the source system.
    r. Similarly prepare a detailed case study of the target system, including Identifying the number of downstream applications and nature of data to be passed along.
    s. Prepare the data mapping template.
    t. Supply the architecture questionnaire to the customers and look for the inputs.
2. Project Planning
    a. Perform project planning and staffing allocation activities.
    b. Identify the tools for implementing the solution and if possible do a case study between the various vendors.
    c. Do a vendor evaluation in term of the cost, licensing issues, functionality requirements etc
    d. Define Migration methodology and approach to the solution.
    e. Prepare the high level design and the business cases in detail.
    f. Set up the process to implement the quality of the deliverable and Change Management in place.
    g. Perform Quality Assurance and Quality Control.
    h. Define milestone metrics and track down the day-to-day issues.
    i. Establish Program Roles and Responsibilities.
    j. Prepare a plan for risk mitigation and crisis management.
    k. Identify the major risk involved during migration and plan for the steps to mitigate in case of crisis arises, also plan for the data security issues.
    l. Plan for the data security issues and user visibility migration and testing.
    m. Look at the functional gaps in the design document and requirements and discuss with the developer and business community and close the same.
    n. Prepare a plan for Data Migration phase.
    o. Prepare a plan for post implementation, training and support activities.
3. Methodology & Solution Approach Environment
    a. Determine database Size:
        Estimate the database size of the sources as well as the target.
        If the size cannot be determined, then estimate on how much of data (in GB) needs to be converted.
        Perform a capacity planning on the hardware requirement a"
    b. Database Constraints:
        Find out the entire database constraints including the business rules, foreign key, null, not null and database triggers.
        Follow a naming convention document and clean up the entity and attributes.
        Generate a document which identifies the constraints so that the same can be recreated after the migration.
    c. Data Quality:
        Do a data profiling.
        Find out the fields which need to be cleaned and define the business rules.
        Use data cleansing tools like Trillium and custom defined business rules and shell scripts for data cleansing operations.
        Use an Extract Transform Load (ETL) Tool.
    d. Test Environment:
        Generate the data migration scripts.
        Generate the data validation test scripts.
        Load the data into the staging area.

Perform your load test analysis and data quality check.

Run the data cleansing process on this staging area e. Quality Analysis (QA) environment:

Load the QA environment with the production data.

Repeat the process done for the test environment.

Fix all the errors which have occurred till now.

Freeze the production data if possible.

Load the QA with the production data f. Production:

Run the migration script as like the QA environment, and compare the data with the required test scripts.

Test thoroughly the data interfaces, perform data sanity checks for quality and pass on the known defects if any to the user community.

4. Support a. Document the deployment document, exception handling and change control process.

Train and educate the users and other application stake holders on end to end process Perform a Continuity of Business (COB) test Do a periodic analysis of the data and determine the deterioration of data quality if any.

Document the best practices and generate awareness within the existing team members.

In various embodiments of the present invention, migration plans in a plurality of other formats conveying similar or different information as that depicted in the exemplary migration plan.

FIG. 2 is a flowchart illustrating a method for performing data migration readiness assessment, data migration effort estimation and providing a recommended data migration plan. At step 202 a migration readiness assessment is performed. A user is prompted to provide responses to a plurality of questions directed towards gathering information for performing a comprehensive assessment of the user's data and data migration requirements. In various embodiments of the present invention, the user is prompted to provide a response to each of the questions presented either by selecting one out of multiple options provided, or by entering a response in a predefined format. In various embodiments of the present invention, a weight is assigned to each question. Further, each of the options corresponding to each of the questions is assigned a predetermined score. The weights and the scores are predetermined based on the criticality and importance of the question and the option in assessing the user's data migration requirements as well as the readiness of the user's data and migration tools. Once the user has provided his response to a predetermined number of questions, a total score is computed by using equation (1) provided with reference to FIG. 1.

At step 204 it is determined if a migration activity is recommended. In an embodiment of the present invention, if the total number of points scored by a user is less than or equal to a first predetermined threshold value, a recommendation against undertaking a migration activity is provided to the user. Alternately, the user may be advised to leverage existing tools in order to perform desired functions. If the total number of points scored by a user is less than or equal to a second predetermined threshold value, a recommendation in favour of undertaking a migration activity is provided to the user. In various embodiments of the present invention, the threshold values are predetermined based on the criticality and importance of the questions responded to by the user for assessing the user's data migration requirements as well as the readiness of the user's data and migration tools.

If a recommendation in favour of performing a migration activity is obtained, at step 206 a total effort involved in the migration in terms of person days is computed. The user is prompted to provide responses to a plurality of questions directed towards gathering information for performing a comprehensive effort estimation. In various embodiments of the present invention, the user is prompted to provide a response to each of the questions presented either by selecting one out of multiple options provided, or by entering a response in a predefined format. In various embodiments of the present invention, the user is required to enter a 'critical value' corresponding to each question in addition to providing a response to the question. The 'critical value' depends on the importance and criticality of the task being referred to in each question. In various embodiments of the present invention, a weight is assigned to each question based on the corresponding response option selected by the user. Further, an effort in person days is computed for each question based on the option selected by the user corresponding to the question. Once the user has provided his response to a predetermined number of questions, a total effort in terms of person days is computed by using equation (5) provided with reference to FIG. 1.

At step 208 migration plan is generated providing the user with step by step instructions to aid the user in executing the migration activity. The migration plan is generated by using the response options provided by the user to the questions presented for performing effort estimation and the total effort estimated in person days. The migration plan generated is dynamic in nature and may change based on the critical values specified and response options selected by the user at step 206.

In an embodiment of the present invention, the system and method illustrated in FIG. 1 and FIG. 2 is implemented by using a spreadsheet tool such as Microsoft Excel. In various other embodiments of the present invention, the system and method for generating a data migration plan may be implemented using any of the conventional software tools/languages.

Hence, the present invention provides a system method for generating a data migration plan which is vendor and technology independent and corresponds to migration of data from any electronic medium to the other. For example, the present invention provides a system and method for migrating data from disk to disk, disk to tape, message queue to flat file, etc. Further, the present invention provides a system and method for performing migration readiness assessment to aid a user in taking an informed decision regarding his migration needs and data readiness. The present invention also provides a system and method for performing a comprehensive and accurate effort estimation for performing data migration from a source platform to a target platform.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

We claim:

1. A non-transitory computer-readable medium storing a computer readable program code for generating a migration plan for migrating data from a first electronic medium to a second electronic medium, the computer readable program code comprising:

a. a migration readiness assessment module for determining a migration recommendation;

b. an effort estimation module for determining a total effort required for migrating data from a first electronic medium to a second electronic medium; and c. a migration plan generator module for generating a migration plan based on the determined migration recommendation and the total determined effort.

2. The computer-readable medium as claimed in claim 1, wherein the migration readiness assessment module comprises a set of questions and a plurality of corresponding response options with respect to each question, each question being associated with a predetermined weight and each response option being associated with a predetermined score.

3. The computer-readable medium as claimed in claim 1, wherein the migration readiness assessment module determines a migration recommendation by computing a summation of the products of weights associated with each question and the score associated with a response option selected corresponding to the question.

4. The computer-readable medium as claimed in claim 1, wherein the migration recommendation is one of a recommendation in favor of migration and a recommendation against migration.

5. The computer-readable medium as claimed in claim 1, wherein the effort estimation module comprises a set of questions and a plurality of corresponding response options with respect to each question, each question being associated with a plurality of predetermined weights, each of the plurality of weights depending upon each of the response options corresponding to the question.

6. The computer-readable medium as claimed in claim 1, wherein the total effort is determined by computing a summation of the products of the weight associated with each question, a critical value corresponding to each question and an effort determined corresponding to each question.

7. The computer-readable medium as claimed in claim 1, wherein the migration plan is a sequence of steps to be followed for performing the migration of data from a first electronic medium to a second electronic medium.

8. A method, implemented by a computer system, for generating a migration plan for migrating data from a first electronic medium to a second electronic medium, the method comprising the steps of:
   a. performing, by the computer system, a migration readiness assessment for determining a migration recommendation;
   b. determining, by the computer system, a total effort required for migrating data from a first electronic medium to a second electronic medium; and
   c. generating, by the computer system, a migration plan based on the determined migration recommendation and the total estimated effort.

9. The method as claimed in claim 8, wherein the step of performing a migration readiness assessment comprises the steps of:
   a. presenting a set of questions for obtaining information regarding data readiness, each question being associated with a predetermined weight and corresponding to a plurality of response options, each response option being associated with a predetermined score;
   b. selecting a response option corresponding to each presented question;
   c. computing a migration assessment weight by determining a summation of the products of weights associated with each question and the score associated with a response option selected corresponding to the question;
   d. determining a migration recommendation based on the computed migration assessment weight, the migration recommendation being one of a recommendation in favour of migration and a recommendation against migration.

10. The method as claimed in claim 8, wherein the step of determining a total effort required for migrating data from a first electronic medium to a second electronic medium comprises the steps of:
   a. presenting a set of questions for obtaining information regarding migration requirements, each question corresponding to a plurality of response options and being associated with a plurality of predetermined weights, the weights varying based on corresponding response options;
   b. selecting a response option corresponding to each presented question;
   c. determining a weight associated with each question depending upon the response option selected for the question;
   d. obtaining a critical value corresponding to each question;
   e. determining an effort corresponding to each question;
   f. computing a summation of the products of the weight associated with each question, the critical value corresponding to each question and the determined effort corresponding to each question.

11. The method as claimed in claim 10, the effort corresponding to each question is determined by using a numerical value associated with the response option selected corresponding to the question.

12. The method as claimed in claim 8, wherein the step of generating a migration plan comprises generating a sequence of execution of tasks involved in the migration based on at least one of complexity of the task, size of the task and priority of the task.

13. A non-transitory computer-readable medium storing a computer readable program code for generating a migration plan for migrating data from a first electronic medium to a second electronic medium, the computer readable program code comprising:
   a. program instruction means for performing a migration readiness assessment for determining a migration recommendation;
   b. program instruction means for determining a total effort required for migrating data from a first electronic medium to a second electronic medium; and
   c. program instruction means for generating a migration plan based on the determined migration recommendation and the total determined effort.

14. The computer-readable medium as claimed in claim 13, wherein the program instruction means for performing a migration readiness assessment comprise:
   a. program instruction means for presenting a set of questions for obtaining information regarding data readiness, each question being associated with a predetermined weight and corresponding to a plurality of response options, each response option being associated with a predetermined score;
   b. program instruction means for selecting a response option corresponding to each presented question;
   c. program instruction means for computing a migration assessment weight by determining a summation of the products of weights associated with each question and the score associated with a response option selected corresponding to the question; and
   d. program instruction means for determining a migration recommendation based on the computed migration assessment weight, the migration recommendation being one of a recommendation in favour of migration and a recommendation against migration.

15. The computer-readable medium as claimed in claim 13, wherein the program instruction means for determining a total effort required for migrating data from a first electronic medium to a second electronic medium comprise:
   a. program instruction means for presenting a set of questions for obtaining information regarding migration requirements, each question corresponding to a plurality of response options and being associated with a plurality of predetermined weights, the weights varying based on corresponding response options;
   b. program instruction means for selecting a response option corresponding to each presented question;
   c. program instruction means for determining a weight associated with each question depending upon the response option selected for the question;
   d. program instruction means for obtaining a critical value corresponding to each question;
   e. program instruction means for determining an effort corresponding to each question; and
   f. program instruction means for computing a summation of the products of the weight associated with each question, the critical value corresponding to each question and the determined effort corresponding to each question.

16. The computer-readable medium as claimed in claim 15, wherein the effort corresponding to each question is determined by using a numerical value associated with the response option selected corresponding to the question.

17. The computer-readable medium as claimed in claim 15, wherein the program instruction means for generating a migration plan comprise program instruction means for generating a sequence of execution of tasks involved in the migration based on at least one of complexity of the task, size of the task and priority of the task.

* * * * *